United States Patent [19]
Peterson et al.

[11] Patent Number: 5,655,726
[45] Date of Patent: Aug. 12, 1997

[54] UNI-DIRECTIONAL CORD TAKE-UP DEVICE

[76] Inventors: Edwin R. Peterson, 4420 Hillcrest, Boise, Id. 83705; Edwin L. Wheeler, 1865 N. Summertree Way, Meridian, Id. 83642

[21] Appl. No.: 600,406

[22] Filed: Feb. 12, 1996

[51] Int. Cl.$^6$ .................................. B65H 75/48
[52] U.S. Cl. .................................. 242/378.2
[58] Field of Search ............... 242/375.1, 378, 242/378.1, 378.2, 378.3, 376, 376.1

[56] References Cited

U.S. PATENT DOCUMENTS

| | | | |
|---|---|---|---|
| 3,657,491 | 4/1972 | Ryder et al. | 242/378 |
| 3,854,017 | 12/1974 | Crim | 242/378 |
| 4,733,832 | 3/1988 | Napierski | 242/378 |
| 4,989,805 | 2/1991 | Burke | 242/378.2 |
| 5,094,396 | 3/1992 | Burke | 242/378.2 |
| 5,114,091 | 5/1992 | Peterson et al. | 242/378.3 |
| 5,230,481 | 7/1993 | Wheeler et al. | 242/378.1 |
| 5,332,171 | 7/1994 | Steff | 242/378 |

*Primary Examiner*—John M. Jillions
*Attorney, Agent, or Firm*—Frank J. Dykas

[57] ABSTRACT

The invention is a dual reel cord take-up device for flat wire cable which has a generally semi-cylindrical upper and lower case half which snap together over a dual-purpose shaft to make two compartments. The first compartment is a cord take-up compartment which is divided in two by a slotted disk on the shaft in that compartment. Flat wire cable is wound on the shaft in both compartments, and extends through two apertures in the walls of the compartment. The cable in one aperture is fixed so it does not move in and out of the aperture. The wire cable in the second aperture is free to extend or retract through the aperture. In the second compartment is a flat coil spring fixed on its outside end to a generally cylindrical spring cup within said compartment, and fixed on its inside end to the dual-purpose shaft in that compartment. The spring cup is biased against rotation except to tighten the spring, so the shaft is continually under tension to rotate and retrieve the cable into the take-up compartment.

5 Claims, 6 Drawing Sheets

UNI-DIRECTIONAL CORD TAKE-UP DEVICE

BACKGROUND OF THE INVENTION

1. Technical Field

This invention relates generally to take-up devices for electrical cords, and more particularly to those take-up devices for flat wire cables used in telephone communication and data transmissions.

2. Background

U.S. Pat. No. 5,230,481 (Wheeler et al.) discloses a dual reel cord take-up device for connecting a telephone and a cooperating handset. This device serves to connect the handset of a telephone to the body of the telephone with a device wherein the connecting cord is wound on a spool. This allows the user of the telephone to pick up the handset, move many feet away from the telephone, and still be connected by cable to the telephone body. When the user returns the handset to the telephone, there is no pile of twisted and coiled extension cord. Instead, all of the phone cable is neatly wound back onto the shaft of the take-up device.

The feature of this system is that when the user of the handset returns the handset to its cradle, the shaft winds up the available cord and just before the handset is placed on the cradle, the take-up reel, with its now much shortened external cable link, can contact the desk or table on which the telephone is situated. This contact can produce an audible clicking sound which the person on the other end of the telephone can hear.

There is a need to invent a device for feeding out electrical cable between a telephone set and its handset, and taking that cable up into a neat package, without having the device be free floating, and creating noise as it contacts objects during retraction and use.

DISCLOSURE OF INVENTION

What we have invented is a cord take-up device for flat wire cable which feeds out or takes up cable at one of its two cable entry ports.

It includes a generally semi-cylindrical upper case half with two parallel compartments in a direction perpendicular to the axis of the cylinder, the first compartment being adapted to receive the first end of a dual-purpose shaft, and the second compartment being adapted to receive the second end of the dual-purpose shaft and a spring cup. The upper case half has snap-fit means for receiving a lower case half and means for receiving a flat wire cable.

Also provided is a generally semi-cylindrical lower case half, also with two compartments which correspond to the first and second compartments of the upper case half. The lower case half also has snap-fit means for receiving and cooperating with said upper case half snap-fit means. The lower case half has means for receiving a flat wire cable and has a second compartment with means for holding the spring cup in the second compartment against rotation in one direction but not the other.

Another feature of the invention is a dual-purpose shaft supported and held in rotatable relationship by both the upper and lower case halves. The shaft is provided on its first end in the first compartment of the upper and lower case halves with a slotted disk which divides the first end of the shaft into two adjacent regions for receiving flat wire cable. The shaft has on its second end in the second compartment of the upper and lower case halves, a slot in the shaft for receiving a spring within the spring cup.

The device also contains a generally cylindrical spring cup within the second compartment of the upper and lower case halves, the spring cup having an outer surface perpendicular to its axis of rotation, means cooperating with the holding means to hold the cup against rotation relative to the upper and lower case halves in one direction but not in the other direction and spring stop means on its inner cylindrical surface for fixing one end of the spring to the spring cup.

The device also contains a flat coil spring within the spring cup, the spring being fixed on its outer end to the spring cup and being fixed on its inner end to the second end of the dual-purpose shaft.

Another feature of our invention is that the spring driven take-up device has an axial surface of the dual-purpose shaft in the first compartment is an enlarging spiral in the direction of rotation when cable is being added to the shaft.

Another feature of our invention is that flat wire cable retractably extends out of only one of the two apertures. The other aperture has a portion of flat wire cable extending from it, but this portion is fixed and does not extend and retract through the aperture.

From the practice of our invention an improved phone cord take-up device is provided, wherein the device remains stationary in relationship to the telephone, and cable moves in and out of only one aperture of the device.

BEST MODE FOR CARRYING OUT INVENTION

Figure 1:
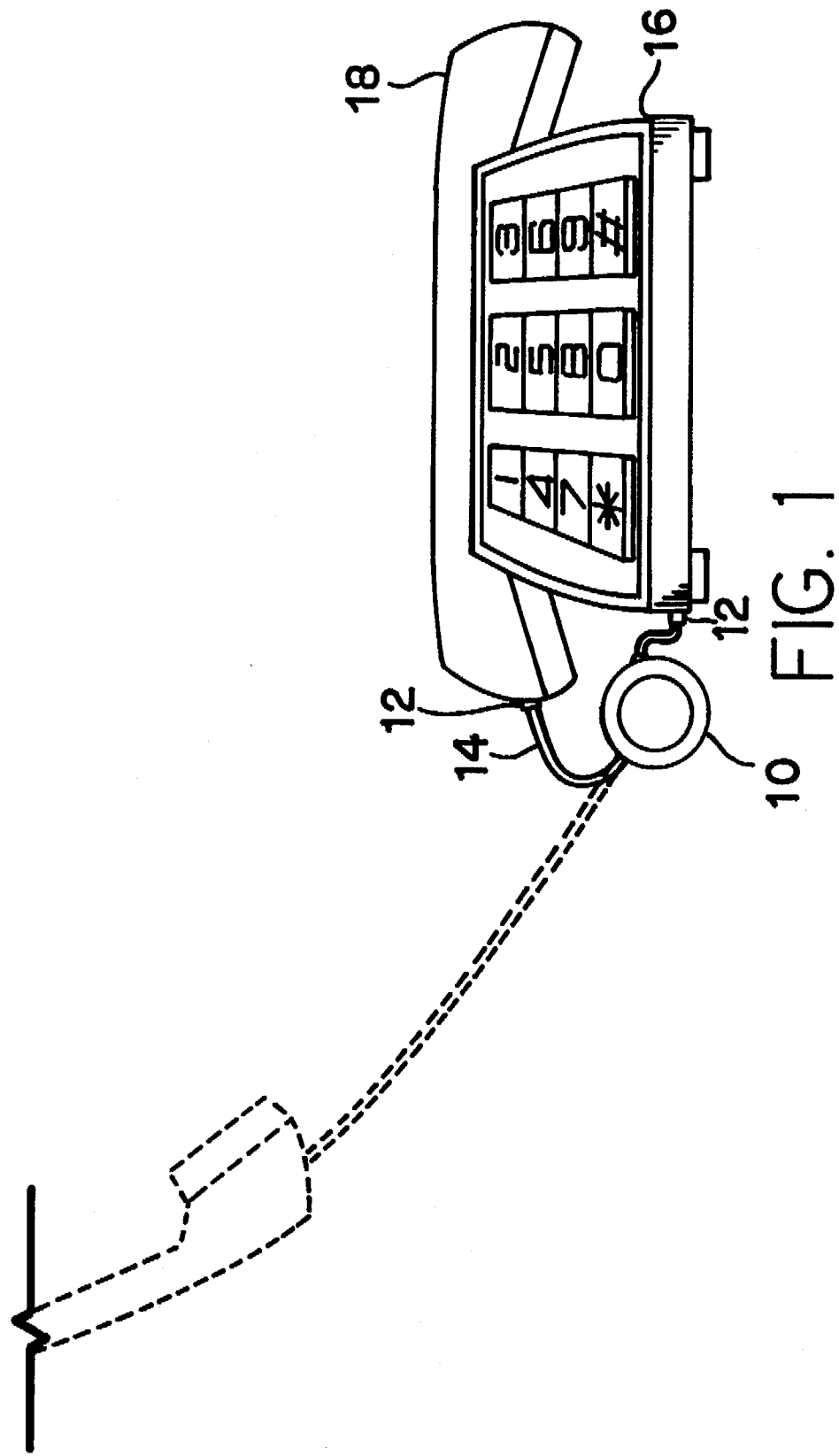
FIG. 1 is a front elevational view of the telephone equipped with a uni-directional dual reel cord take-up device.
Figure 2:
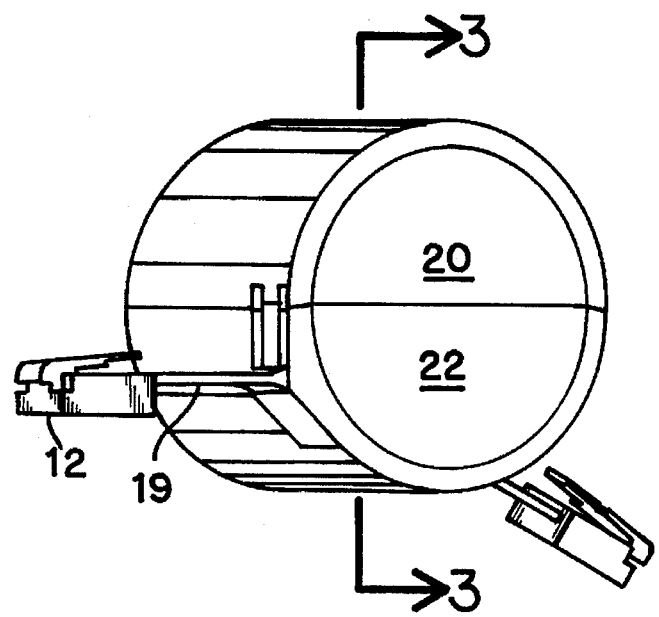
FIG. 2 is a perspective view of our improved cord take-up device.
Figure 3:
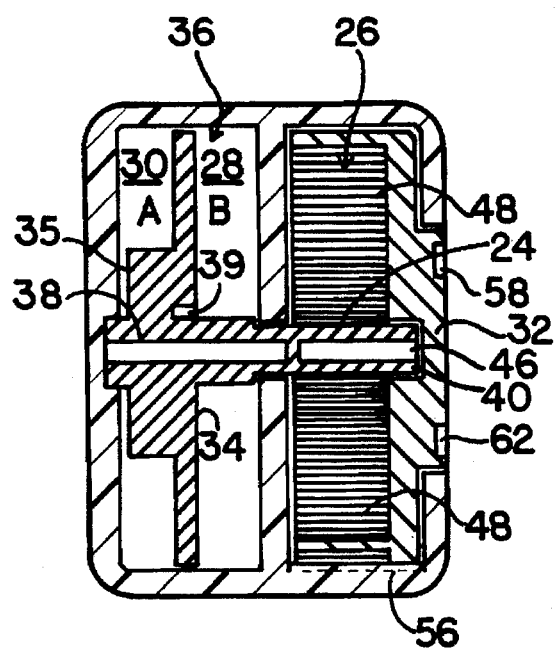
FIG. 3 is a cross-sectional view along line 3—3 in FIG. 2.
Figure 4:
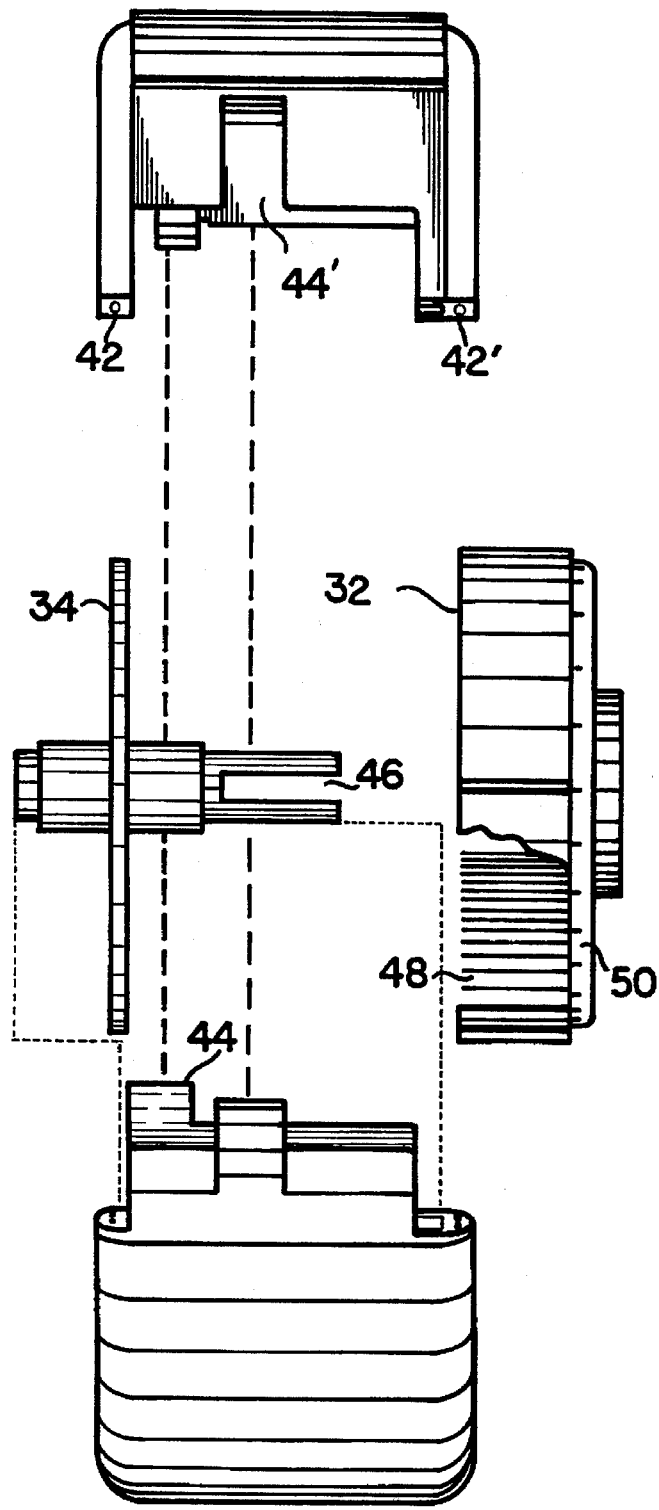
FIG. 4 is an exploded, partly cross-sectional side view of our improved cord take-up device.
Figure 5:
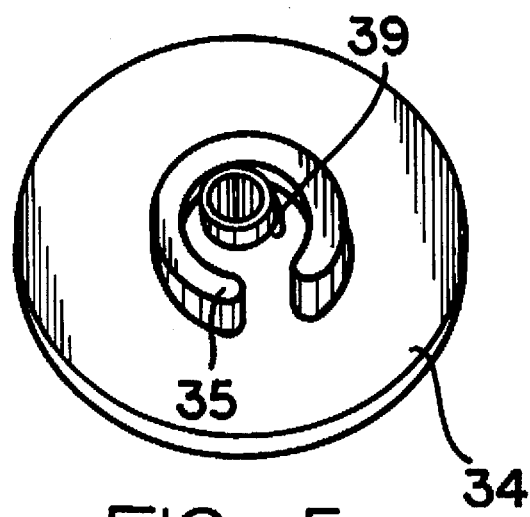
FIG. 5 is a perspective view of the disk which mounts on the dual purpose shaft.
Figure 6:
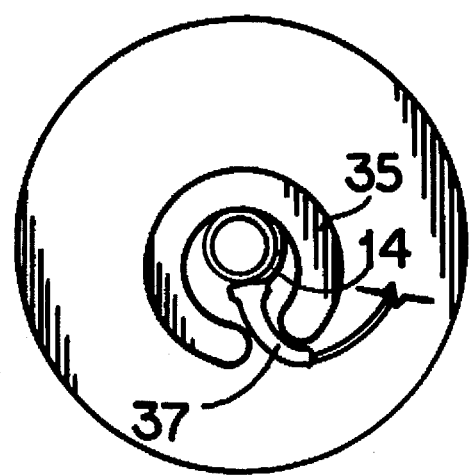
FIG. 6 is a perspective view of the disk which mounts on the dual purpose shaft, with flat cable and a strain relief device shown.
Figure 7:
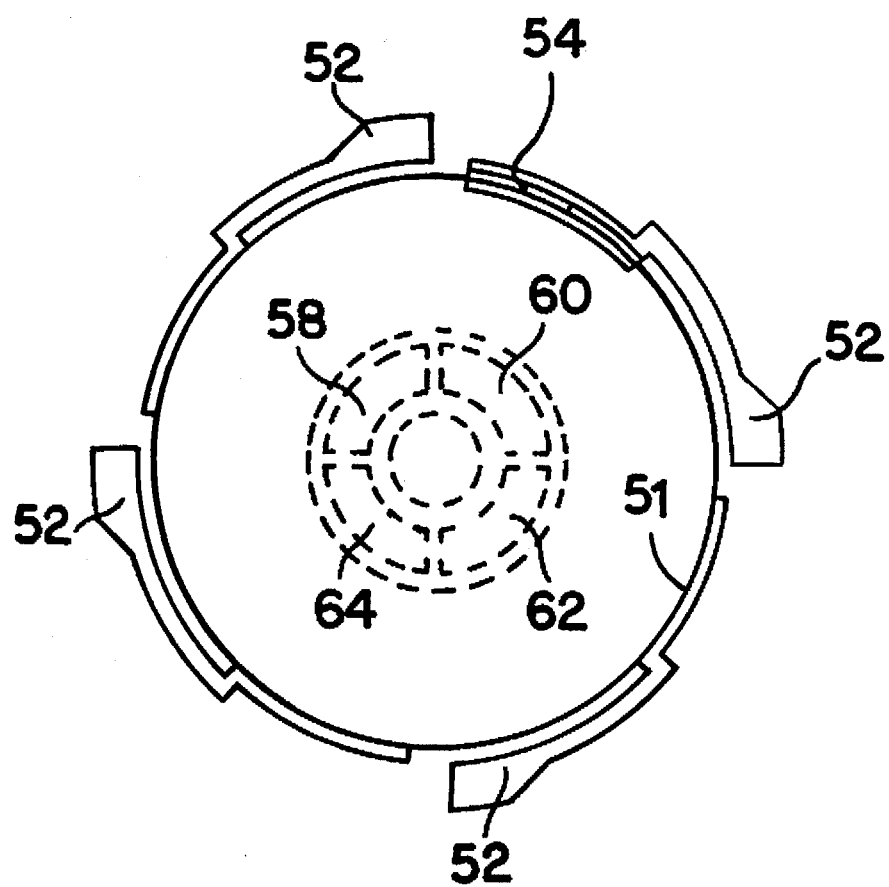
FIG. 7 is a side, outside view of the spring cup of our improved cord take-up device.

Referring to the figures, there is depicted generally our improved uni-directional cord take-up device 10. As shown in FIGS. 2, 3 and 4, generally semi-cylindrical upper case half 20 and lower case half 22 snap fit together to form two parallel compartments, first compartment 36 and second compartment 26 inside take-up device 10. The two compartments are parallel in a direction perpendicular to the axis of the cylinder which the upper and lower case halves create. First compartment 36 is adapted to receive and support in rotatable relationship first end 38 of dual-purpose shaft 24. Likewise, second compartment 26 is adapted to receive and support in rotatable relationship second end 40 of dual-purpose shaft 24.

Upper and lower case halves 20 and 22 both have cooperating snap-fit means 42 and 42' for receiving and cooperating with one another for retaining said upper and lower case halves in fixed mutual relationship. Also, lower case half has means for receiving flat wire cable, apertures 44 and 44'; in the walls of the lower case half, or otherwise in the walls of the first cord take-up compartment.

Figure 9:
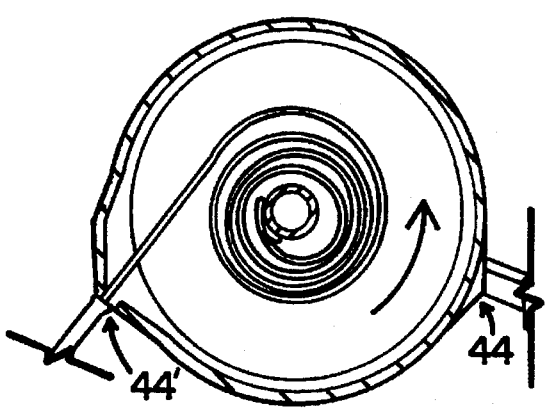
FIG. 9 is a cross-sectional view of compartment 28 looking toward first end 38.
Figure 11:
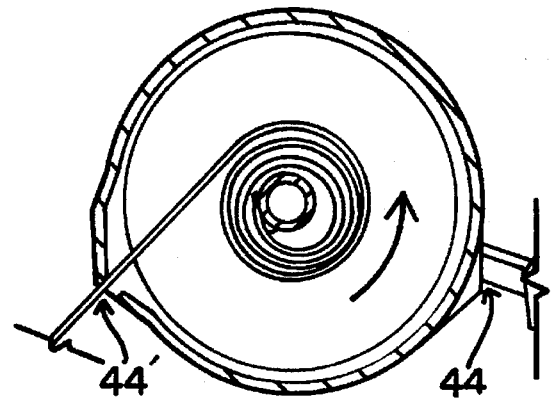
FIG. 11 is a cross-sectional view of compartment 28 looking toward first end 38 of shaft.
Figure 13:
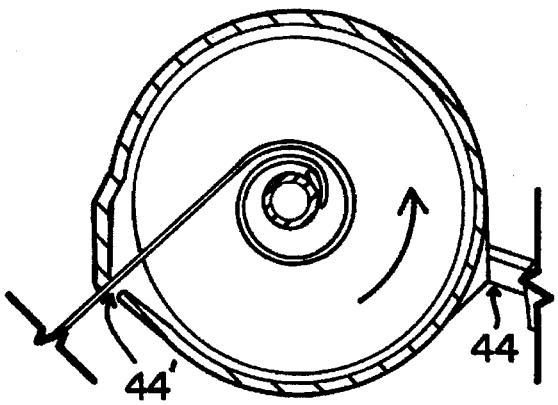
FIG. 13 is a cross-sectional view of compartment 28 looking toward first end 38 of shaft 24.

First end 38 of shaft 24 has a slotted disk 34 which divides the first compartment 36 into two adjacent compartments, 30 and 28. In compartment 28 the flat wire cable is taken up or dispensed by wrapping it around, or unwrapping it from, dual purpose shaft 24. Compartment 30 contains cable which extends a short distance outside of the case of device 10 and attaches to the telephone with phone jack 12. The case can be attached to the plug so it doesnt dangle when in use. The cable which is wrapped around shaft 24 in compartment 30 never leaves the device 10. The adjacent compartment 28 contains flat wire cable which extends outside of the reel case and attaches to the handset. When the user picks up the handset and brings it to his ear, or moves the handset away from the phone, flat wire cable from compartment 28 is dispensed from the shaft 24 through aperture 44'. This is shown in FIGS. 9, 11 and 13, which are cross-sectional views of compartment 28, looking from the second end 40 toward the first end 38 of shaft 24. FIG. 9 shows the device 10 with the cable of compartment 28 fully retracted within the device and wrapped around shaft 24. FIG. 11 shows the same compartment with the cable partially extended outside the compartment and wound off of shaft 24. FIG. 13 shows the same compartment with the cable almost fully extended from shaft 24. As shown in FIG. 13, even when the flat wire cable is fully extended, there are several wraps of cable left around shaft 24. The arrows in FIGS. 9, 11 and 13 show the direction of rotation of shaft 24 as cable exits device 10. As cable enters device 10 and is wound back on to shaft 24, the direction of rotation of shaft 24 would be opposite to that shown.

Figure 8:
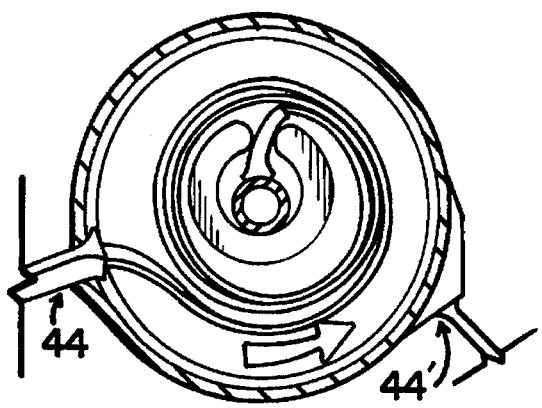
FIG. 8 is a cross-sectional view of compartment 30 looking toward second end 40.
Figure 10:
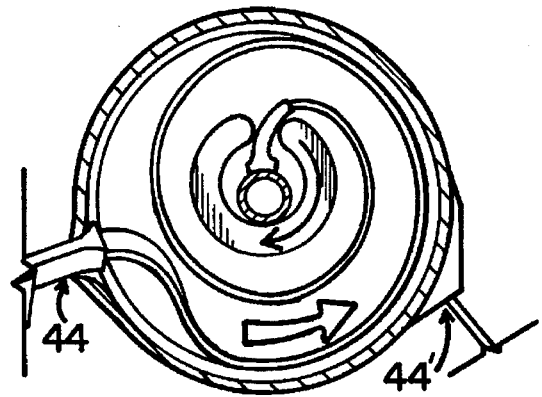
FIG. 10 is a cross-sectional view of compartment 30 looking toward second end 40.
Figure 12:
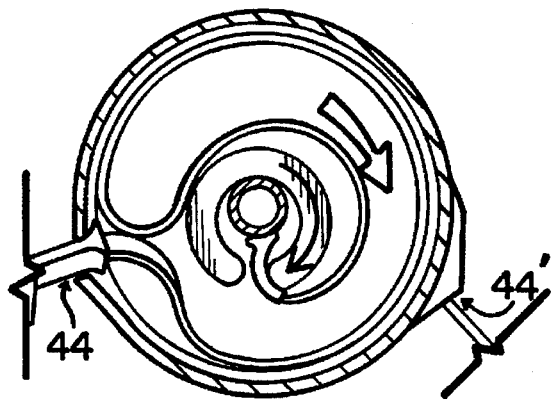
FIG. 12 is a cross-sectional view of compartment 30 looking toward second end 40 of shaft 24.

As the flat wire cable is dispensed from compartment 28 the shaft 24 rotates and the rotation of this shaft causes the flat wire cable wound on the shaft 24 in compartment 30 first to unreel and then to re-reel on to the shaft. This is illustrated in FIGS. 8, 10 and 12. Each of these is a cross-section of compartment 30 looking from first end 38 toward second end 40 of shaft 24. FIG. 8 depicts compartment 30 when none of the cable in compartment 28 has been withdrawn from device 10. As cable is withdrawn from device 10, it exits aperture 44' and unwinds off of shaft 24 from compartment 28. This is shown as FIG. 11. When this is happening, that portion of shaft 24 which is in compartment 30 rotates as shown by the solid arrow in FIG. 10. This rotation of shaft 24 first results in the tightly-wrapped cable shown in FIG. 8 becoming loosely wrapped and pressing against the outside walls of compartment 30, as shown in FIG. 10. As cable continues to be withdrawn from device 10 and wrapped and rolled off of shaft 24 in compartment 28, that part of shaft 24 which is in compartment 30 continues to rotate as shown in the solid arrow in FIGS. 10 and 12. The hollow arrow indicates the direction of cable wrap. This results in the flat cable being wound around shaft 24 in compartment 30 in a counter clockwise direction, as seen when viewed looking from first end 38 toward second end 40 of shaft 24. As cable is retracted into the device 10, the opposite sequence of events occurs. As the handset is returned to the telephone, the flat wire cable which is connected to it is reeled on to the shaft 24 in compartment 28, and the rotation of the shaft 24 causes the flat wire cable in compartment 30 to first unwind, and then rewind on the shaft 24.

Apertures 44 and 44' are constructed to be large enough to allow the passage of flat wire cable through the aperture, but are not large enough to allow the passage of folded flat wire cable. In this way, a kink or twist in the cable is not allowed to pass through the aperture and be wound on to the shaft 24.

In second compartment 26, the second end 40 of dual purpose shaft 24 has diametric slot 46 for receiving the inside end of coiled flat spring 48. Spring 48 is received and fixed at its outside end by spring cup 32 contained within second compartment 26. Spring cup 32 is generally cylindrical with an outer cap surface 50 perpendicular to its axis of rotation, cooperating means 52 which are resilient prongs on its outer cylindrical surface and spring stop means 54 on its inner cylindrical surface. Cup cooperating means 52 is received by and cooperates with second compartment holding means 56 which are notches in the inner cylindrical wall of the second compartment. In this way, spring cup 32 is held against rotation except to tighten the spring 48, so the shaft 24 is continually under tension to rotate away from the spring tension and retrieve the cable into the first take-up compartment 36.

On shaft 24 is mounted disk 34. Mounted on the side of disk 34 which faces into compartment 30 is a semi-circular cushion 35 which extends into compartment 30. This cushion serves as a strain relief device. Within cushion 35 in chamber 30 are wrapped several wraps of flat cable 14. At the point where flat cable 14 extends through the aperture formed by the edges of cushion 35 there is placed a strain relief device 37. This strain relief device serves to protect the delicate conductive elements of flat cable 14 from wear due to repeated bending and strain against ridge of cushion 35.

Preferably, the axial surface of shaft first end 38 is an enlarging spiral in the direction of rotation when cable is being added to the shaft. This way, the roll-up and roll-down action of the take-up device is smoothed in the area of radial slot 39 where the first complete wrap of cable encounters the initial layer of cable.

Also, preferably, spring cup outer cap surface 50 has detents 58, 60, 62 and 64 to permit engagement therein of a simple spanner type tool end for initially tightening the spring 48. This way, our take-up device may be more easily assembled.

Our take-up device components may be made from plastic or other polymeric materials by conventional molding means.

To assemble our invention, first the cable is passed through radial slot 39 of disk 34 and each end is led out apertures 44 and 44'. On the tips of each end of the cable is placed a strain relief device 19 and the electrical connection 12 to attach to the phone and the handset. Then, spring 48 is engaged on its inside end in diametric slot 46 of shaft 24, and on its outside end in spring cup spring stop means 54, and the shaft and spring cup is placed between upper and lower case halves 20 and 22, respectively. Then, the case halves are snapped together, and detents 58, 60, 62 and 64 are engaged, and turned to tighten the spring 48 and wind the cable onto shaft 24 in compartments 30 and 38.

While there is shown and described the present preferred embodiment of the invention, it is to be distinctly understood that this invention is not limited thereto but may be variously embodied to practice within the scope of the following claims.

We claim:

1. A dual reel cord take-up device for flat wire cable which comprises:
   (a) a generally semi-cylindrical upper case half with two parallel compartments in a direction perpendicular to the axis of the cylinder, the first compartment being adapted to receive the first end of a dual-purpose shaft, and the second compartment being adapted to receive the second end of said dual-purpose shaft and a spring cup, said upper case half having snap-fit means for receiving a lower case half and means for receiving a flat wire cable;
   (b) a generally semi-cylindrical lower case half, also with two compartments which correspond to first and second compartments of the upper case half, said lower case half also having snap-fit means for receiving and cooperating with said upper case half snap-fit means for receiving and retaining said upper case half in fixed relationship, said lower case half having means for receiving a flat wire cable and said second compartment having means for holding said spring cup in said second compartment against rotation in one direction but not the other;
   (c) a dual-purpose shaft supported and held in rotatable relationship by both the upper and lower case halves, the shaft being provided on its first end in the first compartment of the upper and lower case halves with a slotted disk which divides the first end of the shaft into two adjacent reels for receiving flat wire cable,
   (d) the slotted disk further dividing the first chamber into two adjacent chambers, the disk having on one surface a semi-circular guide ridge with an aperture through which flat wire cable extends, the flat wire cable extending through two apertures, with one cable end fixed in an aperture and the other cable end free to extend and retract through its aperture, the shaft being provided on its second end in the second compartment of the upper and lower case halves with a slot in the shaft for receiving a spring within the spring cup;
   (e) a generally cylindrical spring cup within the second compartment of the upper and lower case halves, the spring cup having an outer surface perpendicular to its axis of rotation, means cooperating with the holding means to hold the cup against rotation relative to the upper and lower case halves in one direction but not in the other direction and spring stop means on its inner cylindrical surface for fixing one end of the spring to the spring cup; and
   (e) a flat coil spring within the spring cup, the spring being fixed on its outer end to the stop means of the spring cup and being fixed on its inner end to the slot of the second end of the dual-purpose shaft.

2. The take-up device of claim 1 wherein the axial surface of the dual-purpose shaft in the cable take-up reel of the first compartment is an enlarging spiral in the direction of rotation when cable is being added to the shaft.

3. The take-up device of claim 1 wherein the holding means in the second compartment are notches, which notches cooperate and interact with the cooperating means of the spring cup which are resilient prongs on its outer cylindrical surface.

4. The take-up device of claim 1 wherein the spring cup has detent means on its outer surface perpendicular to its axis of rotation for winding the spring.

5. The take-up device of claim 1 wherein the apertures in the lower case half are sufficiently large to permit the passage of flat wire cable, but are not large enough to permit the passage of folded flat wire cable.

* * * * *